United States Patent
Jun et al.

(10) Patent No.: US 11,037,733 B2
(45) Date of Patent: Jun. 15, 2021

(54) MULTILAYER CERAMIC CAPACITOR HAVING DUMMY PATTERN

(71) Applicant: SAMSUNG ELECTRO-MECHANICS CO., LTD., Suwon-si (KR)

(72) Inventors: Ho In Jun, Suwon-si (KR); Sun Cheol Lee, Suwon-si (KR); Kyeong Jun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/561,372

(22) Filed: Sep. 5, 2019

(65) Prior Publication Data

US 2020/0118760 A1  Apr. 16, 2020

(30) Foreign Application Priority Data

Oct. 11, 2018 (KR) .................. 10-2018-0121165
Jul. 5, 2019 (KR) .................. 10-2019-0081447

(51) Int. Cl.
  *H01G 4/30* (2006.01)
  *H01G 4/12* (2006.01)
  *H01G 4/012* (2006.01)
  *H01G 4/224* (2006.01)

(52) U.S. Cl.
  CPC .............. *H01G 4/30* (2013.01); *H01G 4/012* (2013.01); *H01G 4/12* (2013.01); *H01G 4/224* (2013.01)

(58) Field of Classification Search
  CPC .......................................... H01G 4/30
  See application file for complete search history.

(56) References Cited

U.S. PATENT DOCUMENTS

| 2006/0215350 A1* | 9/2006 | Tonogai | H01G 4/30 361/311 |
|---|---|---|---|
| 2012/0019978 A1* | 1/2012 | Yoshida | H01F 27/292 361/301.4 |
| 2014/0131082 A1* | 5/2014 | Ahn | H05K 3/3442 174/260 |
| 2014/0233150 A1* | 8/2014 | Chung | H01G 4/12 361/301.4 |

(Continued)

FOREIGN PATENT DOCUMENTS

| JP | 58160765 A | * | 9/1983 | .............. F24S 70/30 |
| JP | 04302118 A | * | 10/1992 | |

(Continued)

*Primary Examiner* — Eric W Thomas
(74) *Attorney, Agent, or Firm* — Morgan, Lewis & Bockius LLP (57) ABSTRACT

A multilayer ceramic capacitor includes a ceramic body including a plurality of dielectric layers stacked therein in a stacking direction; first and second external electrodes disposed externally on the ceramic body; first and second internal electrodes alternately stacked with the plurality of dielectric layers, forming an internal active layer of the ceramic body, and respectively connected to the first and second external electrodes; a dummy layer, including a conductive material and having a mesh shape, disposed in at least one of an upper cover layer or a lower cover layer respectively disposed above or below the internal active layer of the ceramic body in the stacking direction.

20 Claims, 10 Drawing Sheets

(56) References Cited

U.S. PATENT DOCUMENTS

2014/0240895 A1   8/2014  Lee et al.
2016/0099105 A1*  4/2016  Lee ..................... H01G 4/232
                                                  174/260

FOREIGN PATENT DOCUMENTS

JP        07335473  A  * 12/1995
JP       2012253245 A  * 12/2012
KR   10-2014-0106021 A    9/2014

* cited by examiner

MULTILAYER CERAMIC CAPACITOR HAVING DUMMY PATTERN

CROSS-REFERENCE TO RELATED APPLICATION(S)

This application claims the benefit of priority to Korean Patent Application No. 10-2018-0121165 filed on Oct. 11, 2018, and Korean Patent Application No. 10-2019-0081447 filed on Jul. 5, 2019 in the Korean Intellectual Property Office, the entire disclosures of which are incorporated herein by reference.

TECHNICAL FIELD

The present disclosure relates to a multilayer ceramic capacitor having a dummy pattern.

BACKGROUND

Generally, there has been increasing demand for a multilayer ceramic capacitor (MLCC), a multilayer chip electronic component, to have a reduced size, high capacitance, and high reliability. Such an MLCC has been used in a variety of electronic products, including imaging devices such as a liquid crystal display (LCD), a plasma display panel (PDP), and the like, and computers, personal digital assistants (PDA), mobile phones, and the like.

An MLCC may include a ceramic body and internal electrodes disposed in the ceramic body, and may include dissimilar materials. Such an MLCC including dissimilar materials may be required to have sufficient stiffness and strength against external stresses.

However, as dissimilar materials may have different coefficients of thermal expansion (CTE), internal stress may increase, which may cause the issues affecting reliability, such as active cover delamination, cracks, and the like.

Generally, to improve warpage strength of an MLCC, a dummy electrode layer overlapping an internal electrode may be disposed on an upper cover layer and a lower cover layer of an MLCC to improve strength and stiffness. However, there may be a limitation in improving strength and stiffness by only disposing a dummy electrode layer having an electrode shape on the upper and lower cover layers formed using a conductive paste having uniform thickness.

SUMMARY

An aspect of the present disclosure is to provide a multilayer ceramic capacitor including a dummy pattern having a mesh shape.

According to an aspect of the present disclosure, a multilayer ceramic capacitor may include: a ceramic body including a plurality of dielectric layers stacked therein in a stacking direction; first and second external electrodes disposed externally on the ceramic body; first and second internal electrodes alternately stacked with the plurality of dielectric layers, forming an internal active layer of the ceramic body, and respectively connected to the first and second external electrodes; a dummy layer, including a conductive material and having a mesh shape, disposed in at least one of an upper cover layer or a lower cover layer respectively disposed above or below the internal active layer of the ceramic body in the stacking direction.

According to another aspect of the present disclosure, a multilayer ceramic capacitor may include: a ceramic body including a plurality of dielectric layers stacked therein in a stacking direction; a first external electrode disposed on a first external surface of the ceramic body; a second external electrode disposed on a second external surface different from the first external surface of the ceramic body; one or more first internal electrodes alternately stacked with the plurality of dielectric layers in an internal active layer of the ceramic body, exposed to the first external surface of the ceramic body, and connected to the first external electrode; one or more second internal electrodes alternately stacked with the plurality of dielectric layers and the one or more first internal electrodes in the internal active layer of the ceramic body, exposed to the second external surface of the ceramic body, and connected to the second external electrode; an upper dummy layer, including a conductive material and having a mesh shape, disposed in an upper cover layer disposed above the internal active layer of the ceramic body in the stacking direction; and a lower dummy layer, including a conductive material and having a mesh shape, disposed in a lower cover layer disposed below the internal active layer of the ceramic body in the stacking direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described with reference to the accompanying drawings.

The present disclosure may, however, be exemplified in many different forms and should not be construed as being limited to specific exemplary embodiments set forth herein.

It is to be understood that structures, shapes, and sizes described as exemplary embodiments in the present disclosure are merely examples to help in an understanding of technical matters of the present disclosure, and thus, are not limited thereto, but various modifications can be made without departing from the spirit and scope of the present disclosure. The various embodiments can be combined with one or more other embodiments to form new embodiments.

In the drawings, the same elements having the same function in the overall descriptions will be described with use of the same reference numeral.

Figure 1:
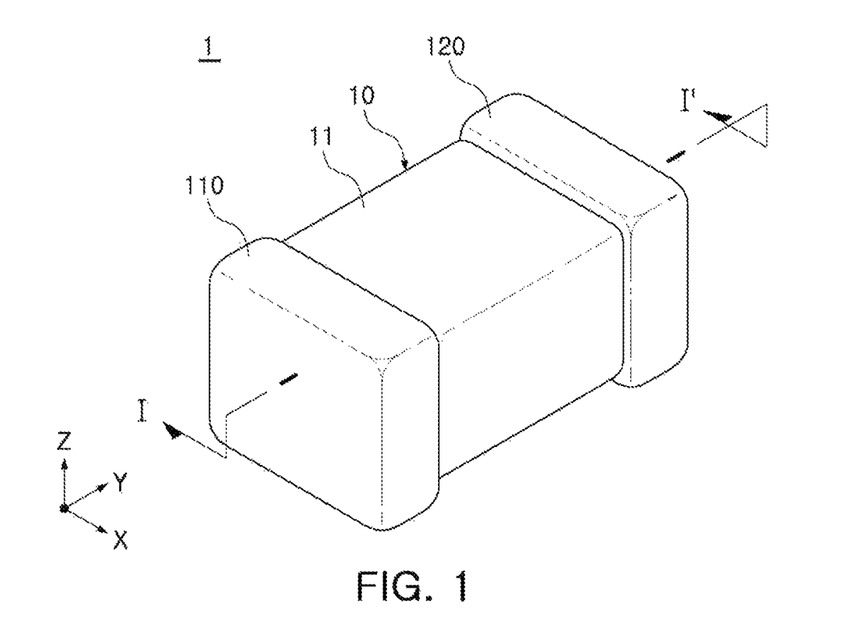
FIG. 1 is a perspective diagram illustrating an example of a multilayer ceramic capacitor according to an exemplary embodiment of the present disclosure.

FIG. 1 is a perspective diagram illustrating an example of a multilayer ceramic capacitor according to an exemplary embodiment of the present disclosure.

Referring to FIG. 1, a multilayer ceramic capacitor according to an exemplary embodiment of the present disclosure may include a ceramic body 10, a first external electrode 110, and a second external electrode 120.

The ceramic body 10 may include a structure in which a plurality of dielectric layers 11 are stacked.

The first external electrode 110 and the second external electrode 120 may be disposed externally on the ceramic body 10.

For example, the first external electrode 110 may be disposed on a first external surface A1 (FIG. 2) of the ceramic body 10, and the second external electrode 120 may be disposed on a second external surface A2 (FIG. 2) of the ceramic body 10 different from the first external surface A1.

The first external electrode 110 and the second external electrode 120 may be disposed on both end portions of the ceramic body 10 taken in a length direction (e.g., Y axis direction).

In FIGS. 1 through 6 and FIG. 10, a height direction of the multilayer ceramic capacitor 1 may be defined as a Z axis, a length direction of the multilayer ceramic capacitor 1 may be defined as a Y axis, and a width direction of the multilayer ceramic capacitor 1 may be defined as an X axis.

In the descriptions below, irrelevant and overlapping descriptions of the same elements having the same reference number and the same function will not be provided, and mainly differences between the examples in the diagrams will be described.

Figure 2:
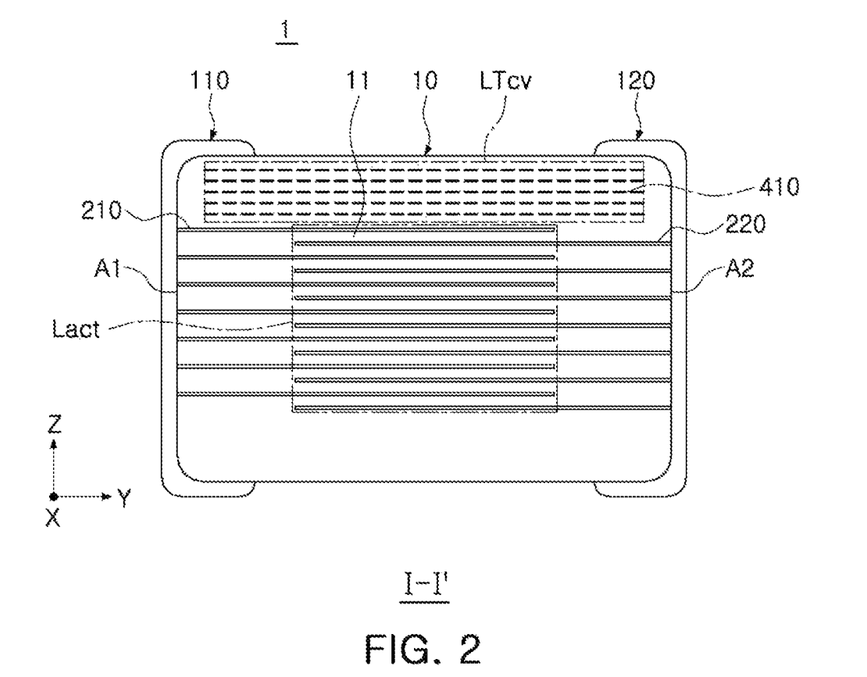
FIG. 2 is a cross-sectional diagram taken along line I-I' in FIG. 1.
Figure 3:
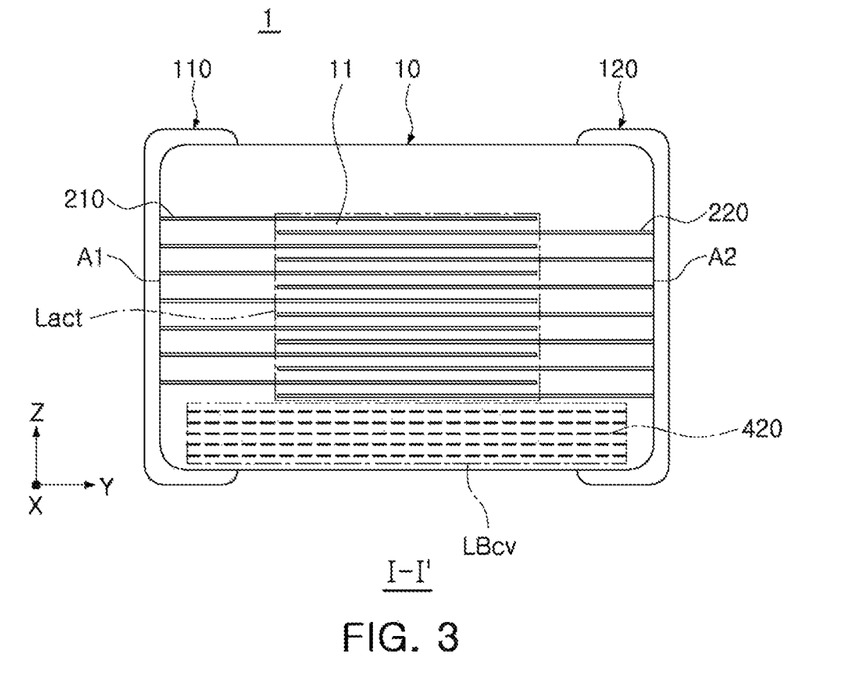
FIG. 3 is a cross-sectional diagram taken along line I-I' in FIG. 1.
Figure 4:
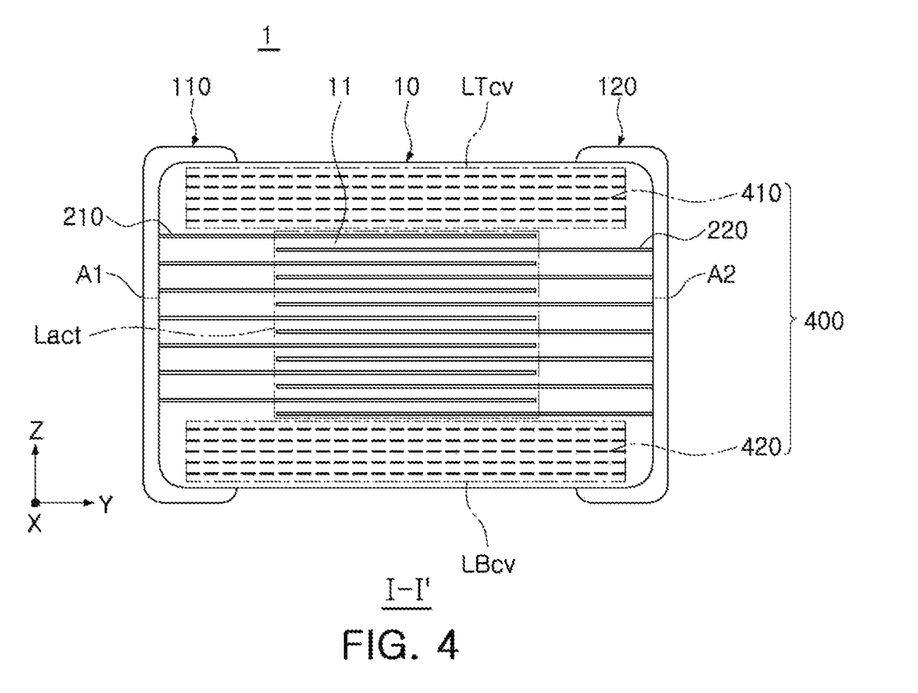
FIG. 4 is a cross-sectional diagram taken along line I-I' in FIG. 1.

FIG. 2 is a cross-sectional diagram taken along line I-I' in FIG. 1. FIG. 3 is a cross-sectional diagram taken along line I-I' in FIG. 1. FIG. 4 is a cross-sectional diagram taken along line I-I' in FIG. 1.

Referring to FIGS. 2, 3 and 4, a ceramic body 10 may be formed by layering a plurality of dielectric layers 11 and sintering the stacked plurality of dielectric layers 11. The shape, the size, and the number of stacked dielectric layers 11 in the diagrams are provided as examples, and examples of the shape, the size, and the number of stacked dielectric layers 11 are not limited thereto.

The plurality of dielectric layers 11 included in the ceramic body 10 may be in a sintered state, and the plurality of dielectric layers 11 may be integrated with each other such that a boundary between adjacent dielectric layers 11 may not be identified without using a scanning electron microscope (SEM). The ceramic body 10 may include an active layer Lact contributing to formation of capacitance of the capacitor, and an upper cover layer LTcv and a lower cover layer LBcv disposed in an upper portion and a lower portion of the active layer Lact, respectively, as upper and lower margin portions.

The active layer Lact of the multilayer ceramic capacitor 1 may include a plurality of first and second internal electrodes 210 and 220 alternately stacked with the dielectric layers 11 interposed therebetween. The dielectric layer 11 may include a ceramic powder having a high dielectric constant, such as a barium titanate ($BaTiO_3$)-based powder, or a strontium titanate ($SrTiO_3$)-based powder, for example, but an example of the ceramic powder is not limited thereto.

The first internal electrode 210 may be alternately stacked with the plurality of dielectric layers 11 on the internal active layer Lact of the ceramic body 10, may be exposed to the first external surface A1 of the ceramic body 10, and may be connected to the first external electrode 110.

The second internal electrode 220 may be alternately stacked with the plurality of dielectric layers 11 and the first internal electrode 210 on the internal active layer Lact of the ceramic body 10, may be exposed to the second external surface A2 of the ceramic body 10, and may be connected to the second external electrode 120.

Accordingly, when a voltage is applied to the first and second external electrodes 110 and 120, electric charge may be accumulated between the first and second internal electrodes 210 and 220 opposing each other, and capacitance of the multilayer ceramic capacitor 1 may be proportional to an area of overlap between the first and second internal electrodes 210 and 220.

The dielectric layers 11 of the upper and lower cover layers LTcv and LBcv may be formed of a material the same as a material of the dielectric layer 11 of the active layer Lact. The upper and lower cover layers LTcv and LBcv may be formed by disposing a single dielectric layer or layering two or more dielectric layers in each of an upper portion and a lower portion of the active layer Lact in upward and downward directions (e.g., z axis direction), and the upper and lower cover layers LTcv and LBcv may prevent damages to the first and second internal electrodes 210 and 220 caused by physical or chemical stresses.

The multilayer ceramic capacitor 1 may include a dummy layer 400 disposed on one of the upper cover layer LTcv and the lower cover layer LBcv disposed in an upper portion and a lower portion of the active layer Lact of the ceramic body 10, that is, in an internal region (FIG. 2) of the upper cover layer LTcv or an internal region (FIG. 3) of the lower cover layer LBcv, or in an internal region of the upper cover layer LTcv or an internal region (FIG. 4) of the lower cover layer LBcv.

The dummy layer 400 may be formed of a conductive material and may have a mesh shape, and the conductive material may be a metal.

For example, the mesh shape may be repetitive patterns formed by intersecting lines formed of a conductive material. In the repetitive patterns, the same shape may be repeated, or different shapes may be repeated.

Referring to FIG. 2, the dummy layer 400 may include an upper dummy layer 410. Referring to FIG. 3, the dummy layer 400 may include a lower dummy layer 420. Referring to FIG. 4, the dummy layer 400 may include an upper dummy layer 410 and a lower dummy layer 420.

The upper dummy layer 410 may be formed of a conductive material and may have a mesh shape, and may be disposed in the upper cover layer LTcv disposed in an upper portion of the internal active layer Lact of the ceramic body 10.

The lower dummy layer 420 may be formed of a conductive material and may have a mesh shape, and may be disposed in the lower cover layer LBcv disposed in a lower portion of the internal active layer Lact of the ceramic body 10.

Each of the upper dummy layer 410 and the lower dummy layer 420 may include at least one dummy pattern layer, and the configuration will be described with reference to FIGS. 5 through 8 later.

In exemplary embodiments of the present disclosure, each dummy pattern layer may not be connected to the first and second external electrodes 110 and 120, and may not be connected to the first and second internal electrodes 210 and 220.

Figure 5:
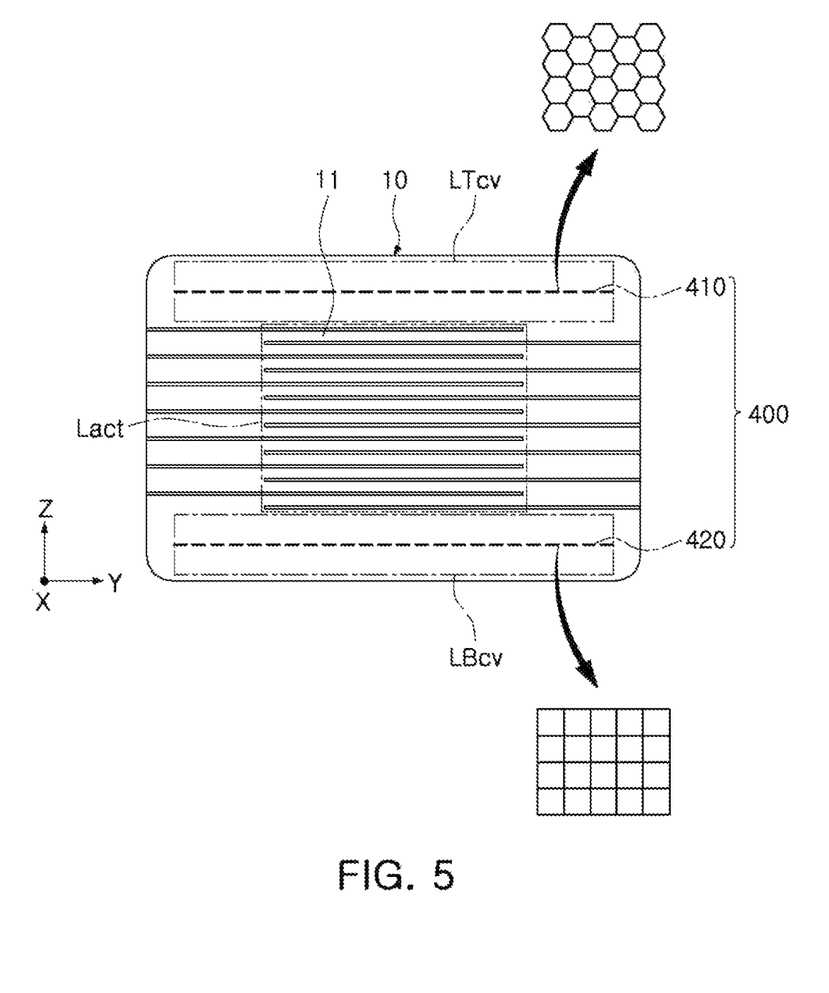
FIG. 5 is a diagram illustrating an example of a mesh pattern of a dummy layer according to an exemplary embodiment of the present disclosure.

FIG. 5 is a diagram illustrating an example of a mesh pattern of a dummy layer according to an exemplary embodiment of the present disclosure. Referring to FIG. 5, an upper dummy layer 410 may include a single upper dummy pattern layer, and a lower dummy layer 420 may include a single lower dummy pattern layer. The upper dummy pattern layer and the lower dummy pattern layer may include mesh patterns having different shapes.

As an example, the upper dummy pattern layer may include a hexagonal mesh pattern, and the lower dummy pattern layer may include a square mesh pattern.

Figure 6:
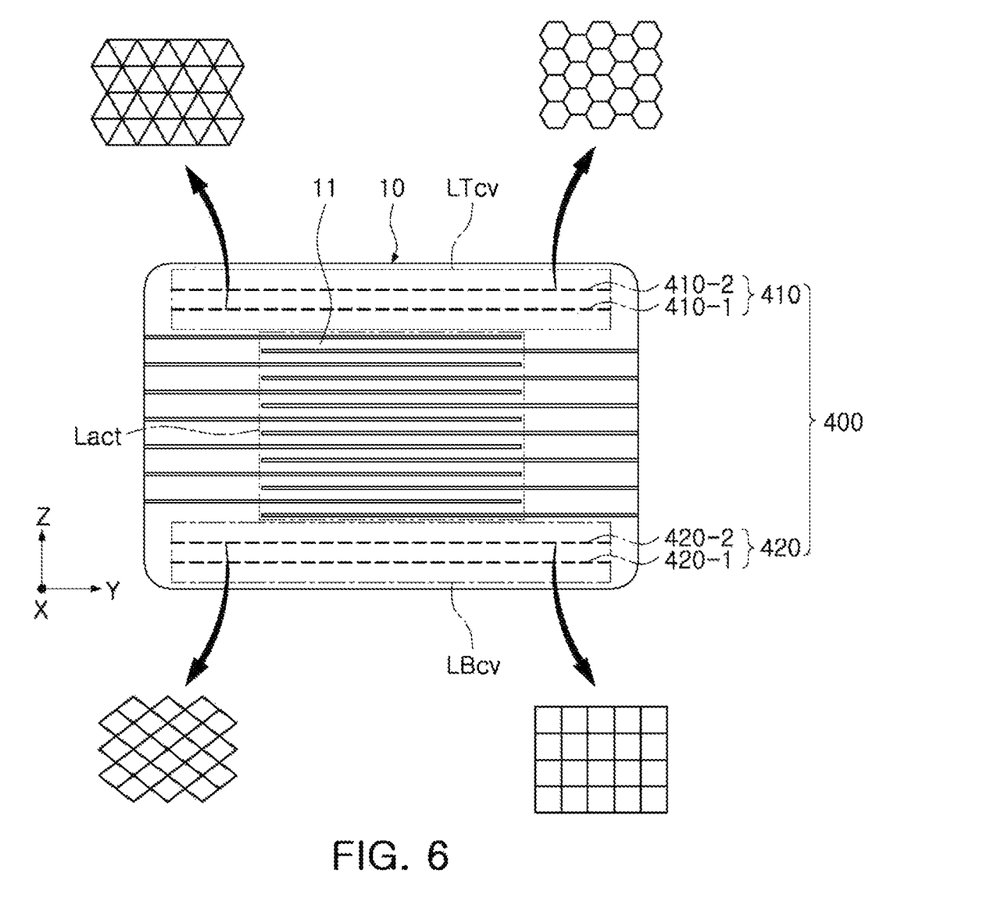
FIG. 6 is a diagram illustrating another example of a mesh pattern of a dummy layer according to another exemplary embodiment of the present disclosure.
Figure 7:
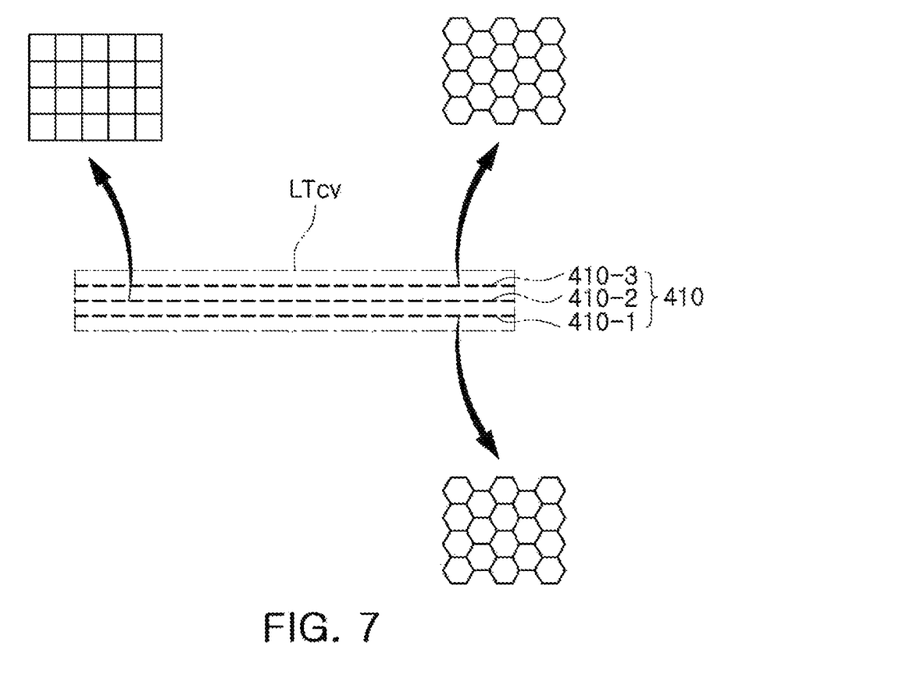
FIG. 7 is a diagram illustrating another example of a mesh pattern of a dummy layer according to an exemplary embodiment of the present disclosure.

FIG. 6 is a diagram illustrating another example of a mesh pattern of a dummy layer according to another exemplary embodiment of the present disclosure. FIG. 7 is a diagram illustrating another example of a mesh pattern of a dummy layer according to an exemplary embodiment of the present disclosure.

Referring to FIG. 6, as described above, a dummy layer 400 may include, for example, an upper dummy layer 410 and a lower dummy layer 420.

The upper dummy layer 410 may include first and second upper dummy pattern layers 410-1 and 410-2 alternately stacked with the plurality of dielectric layers 11, and the first upper dummy pattern layer 410-1 and the second upper dummy pattern layer 410-2 may have different shapes of patterns. For example, the first upper dummy pattern layer 410-1 may include a triangular mesh pattern, and the second upper dummy pattern layer 410-2 may include a hexagonal mesh pattern.

The lower dummy layer 420 may include first and second lower dummy pattern layers 420-1 and 420-2 alternately stacked with the plurality of dielectric layers 11. The first lower dummy pattern layer 420-1 and the second lower dummy pattern layer 420-2 may include mesh patterns having different shapes. For example, the first lower dummy pattern layer 420-1 may include a square mesh pattern, and the second lower dummy pattern layer 420-2 may include a diamond-shaped mesh pattern.

Referring to FIG. 7, for example, when the upper dummy layer 410 includes first, second, and third upper dummy pattern layers 410-1, 410-2, and 410-3 alternately stacked with the plurality of dielectric layers 11, at least one of the first, second, and third upper dummy pattern layers 410-1, 410-2, and 410-3 may include a mesh pattern having a shape different from shapes of mesh patterns of the other upper dummy pattern layers. For example, the first upper dummy pattern layer 410-1, the second upper dummy pattern layer 410-2, and the third upper dummy pattern layer 410-3 may include a hexagonal mesh pattern, a square mesh pattern, and a hexagonal mesh pattern, respectively, but the mesh patterns are not limited thereto.

As described above, when the lower dummy layer 420 includes first, second, and third lower dummy pattern layers (not illustrated) alternately stacked with the plurality of dielectric layers 11, at least one of the first, second, and third lower dummy pattern layers may have a mesh pattern having a shape different from shapes of mesh patterns of the other lower dummy pattern layers. For example, the first lower dummy pattern layer, the second lower dummy pattern layer, and the third lower dummy pattern layer may include a hexagonal mesh pattern, a square mesh pattern, and a hexagonal mesh pattern, respectively, but the mesh patterns are not limited thereto.

Figure 8:
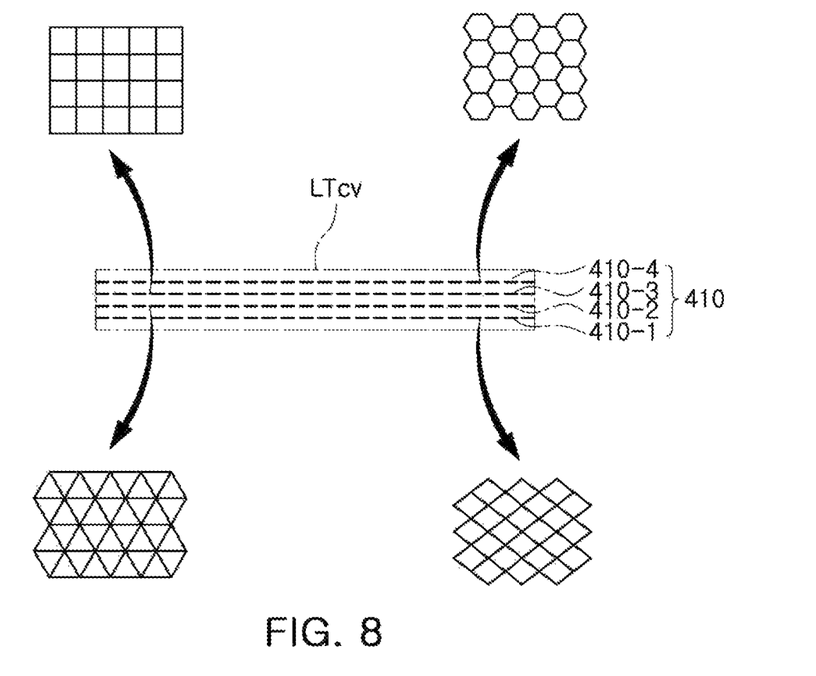
FIG. 8 is a diagram illustrating another example of a mesh pattern of a dummy layer according to an exemplary embodiment of the present disclosure.

FIG. 8 is a diagram illustrating another example of a mesh pattern of a dummy layer according to an exemplary embodiment of the present disclosure.

Referring to FIG. 8, an upper dummy layer 410 may include first, second, third, and fourth upper dummy pattern layers 410-1, 410-2, 410-3, and 410-4 alternately stacked with a plurality of dielectric layers 11, and the first, second, third, and fourth upper dummy pattern layers 410-1, 410-2, 410-3, and 410-4 may include mesh patterns having different shapes. As an example, the first, second, third, and fourth upper dummy pattern layers 410-1, 410-2, 410-3, and 410-4 may include a diamond-shaped mesh pattern, a triangular mesh pattern, a square mesh pattern, and a hexagonal mesh pattern, respectively.

Similarly to the structure of the upper dummy layer 410, a lower dummy layer 420 may include first, second, third, and fourth lower dummy pattern layers alternately stacked with the plurality of dielectric layers 11, and the first, second, third, and fourth lower dummy pattern layers may include mesh patterns having different shapes.

As described above, referring to FIGS. 5 through 8, according to exemplary embodiments of the present disclosure, the upper dummy layer 410 and/or the lower dummy layer 420 may include a single dummy pattern layer or a plurality of dummy pattern layers. When a plurality of dummy pattern layers are included, the plurality of dummy pattern layers may have the same shape of pattern, or a shape of at least one of the plurality of dummy pattern layers may be different from shapes of the others.

Figure 9:
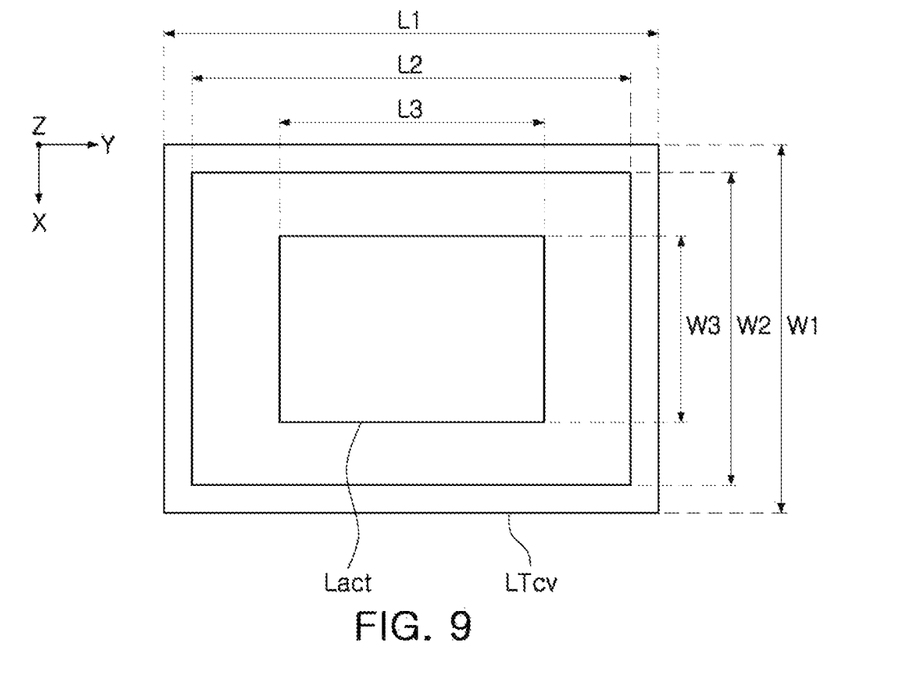
FIG. 9 is a diagram illustrating an example of a size of a dummy layer according to an exemplary embodiment of the present disclosure.

FIG. 9 is a diagram illustrating an example of a size of a dummy layer according to an exemplary embodiment of the present disclosure.

FIG. 9 illustrates a relative size of an upper dummy layer LTcv of a multilayer ceramic capacitor, relative to sizes of a ceramic body 10 and an active layer Lact.

Referring to FIG. 9, as described above, when a height direction of the multilayer ceramic capacitor 1 is defined as a Z axis, a length direction of the multilayer ceramic capacitor 1 is defined as a Y axis, and a width direction of the multilayer ceramic capacitor 1 is defined as an X axis, a length L2 of the upper dummy layer LTcv taken in the Y axis direction may be less than a length L1 of the ceramic body 10, and may be greater than a length L3 of the active layer Lact. As another example, the length L2 of the upper dummy layer LTcv taken in the Y axis direction may be shorter than the length L3 of the active layer Lact.

A width W2 of the upper dummy layer LTcv taken in the X axis direction may be less than a width W1 of the ceramic body 10, and may be greater than a width W3 of the active layer Lact. As another example, the width W2 of the upper dummy layer LTcv taken in the X axis direction may be less than the width W3 of the active layer Lact.

Figure 10:
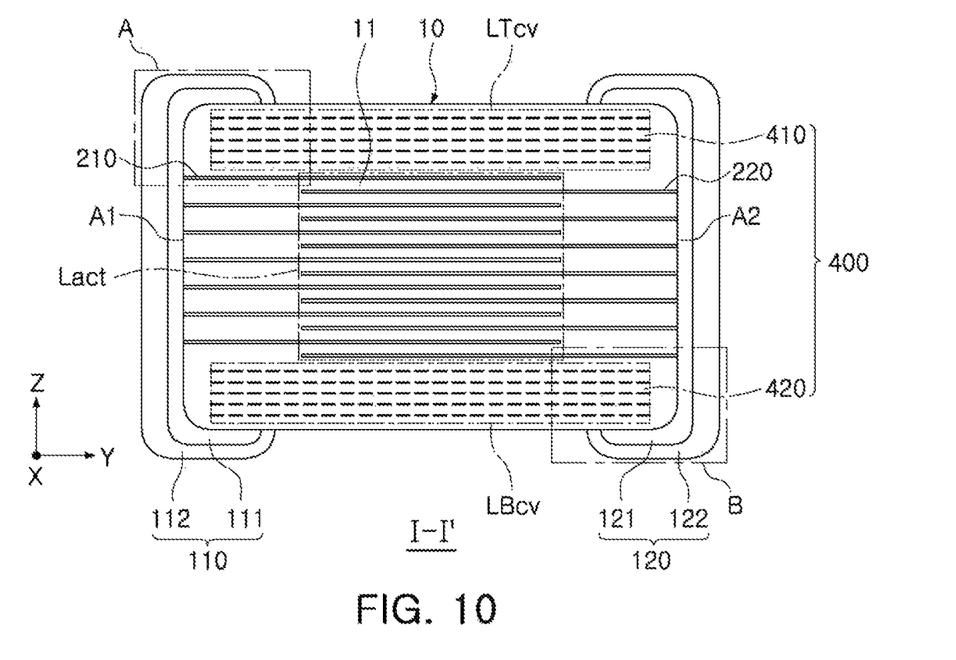
FIG. 10 is a diagram illustrating examples of first and second external electrodes according to an exemplary embodiment of the present disclosure.

FIG. 10 is a diagram illustrating examples of first and second external electrodes according to an exemplary embodiment of the present disclosure.

Referring to FIG. 10, for example, a first external electrode 110 may include a first internal-side external electrode 111 directly connected to a first internal electrode 210, and a first external-side external electrode 112 externally surrounding the first internal-side external electrode 111. As an example, the second external electrode 120 may include a second internal-side external electrode 121 directly connected to a second internal electrode 220, and a second external-side external electrode 122 externally surrounding the second internal-side external electrode 121.

According to an exemplary embodiment of the present disclosure, the first and second internal-side external electrodes 111 and 121 may be formed using a paste of a conductive material. For example, the conductive metal may be nickel (Ni), copper (Cu), palladium (Pd), gold (Au), or alloys thereof, but an example of the conductive metal is not limited thereto. The first external-side external electrode 112 and the second external-side external electrode 122 may be formed of nickel or tin, but an example of the material is not limited thereto. The first external-side external electrode 112 and the second external-side external electrode 122 may be formed of a conductive material.

When each of the upper and lower dummy layers 410 and 420 includes a plurality of dummy pattern layers alternately stacked with a plurality of dielectric layers in a Z axis direction, a length of each of the plurality of dummy pattern layers taken in the Y axis direction may be configured to be the same, or portions of the lengths may be configured to be different. An example of the configuration will be described with reference to FIGS. 11 and 12 as follows.

Figure 11:
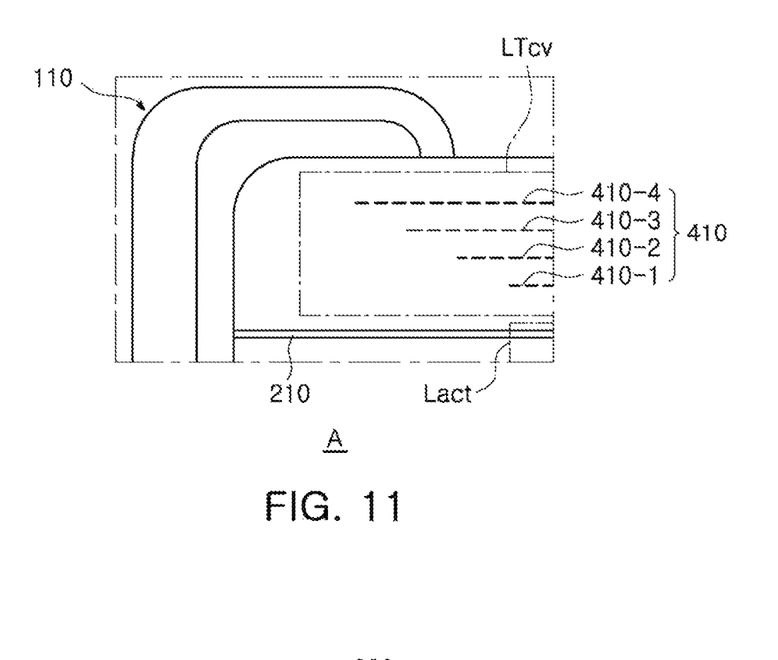
FIG. 11 is an enlarged diagram illustrating an example of partial region A illustrated in FIG. 10.

FIG. 11 is an enlarged diagram illustrating an example of partial region A illustrated in FIG. 10. Referring to FIG. 11, lengths of a plurality of upper dummy pattern layers 410-1, 410-2, 410-3, and 410-4 of an upper dummy layer 410 taken in a length direction (e.g., Y axis direction) may gradually increase from an internal region of a ceramic body 10 to an external region in a stacking direction (e.g., Z axis direction) of the plurality of upper dummy pattern layers 410-1, 410-2, 410-3, and 410-4. However, such a configuration is not limited thereto.

Figure 12:
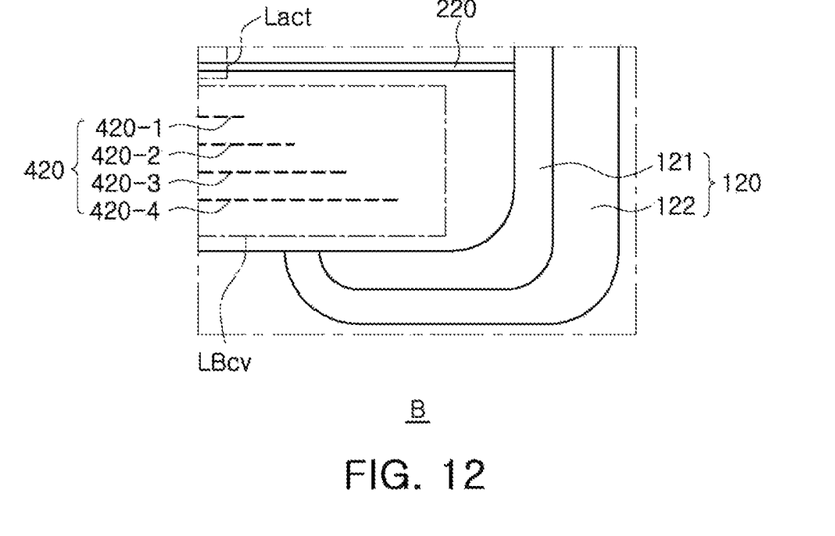
FIG. 12 is an enlarged diagram illustrating an example of partial region B illustrated in FIG. 10.

FIG. 12 is an enlarged diagram illustrating an example of partial region B illustrated in FIG. 10.

Referring to FIG. 12, length of a plurality of lower dummy pattern layers 420-1, 420-2, 420-3, and 420-4 of a lower dummy layer 420 taken in a length direction (e.g., Y axis direction) may gradually increase from an internal region of a ceramic body 10 to an external region in a stacking direction (e.g., Z axis direction) of the plurality of lower dummy pattern layers 420-1, 420-2, 420-3, and 420-4. However, such a configuration is not limited thereto.

When each of the upper and lower dummy layers 410 and 420 includes a plurality of dummy pattern layers alternately stacked with the plurality of dielectric layers in the Z axis direction, thicknesses of the plurality of dummy pattern layers may be configured to be the same, or portions of the thicknesses may be configured to be different. An example of the configuration will be described with reference to FIG. 16 later.

Figure 13:
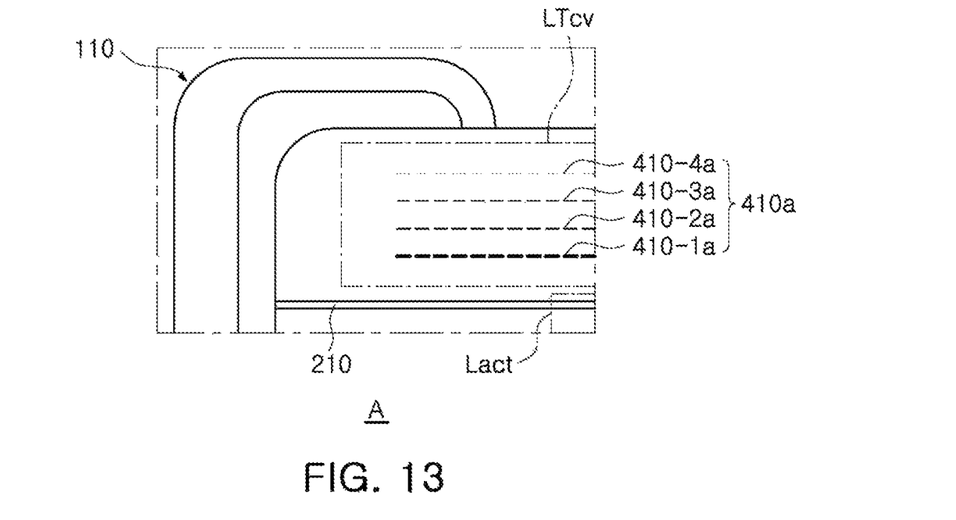
FIG. 13 is an enlarged diagram illustrating another example of partial region A illustrated in FIG. 10.

FIG. 13 is an enlarged diagram illustrating another example of partial region A illustrated in FIG. 10.

Referring to FIG. 13, thicknesses of a plurality of upper dummy pattern layers 410-1a, 410-2a, 410-3a, and 410-4a of an upper dummy layer 410 may decrease from an internal region of a ceramic body 10 to an external region in a stacking direction (e.g., Z axis direction) of the plurality of upper dummy pattern layers 410-1a, 410-2a, 410-3a, and 410-4a.

Lengths of the plurality of upper dummy pattern layers 410-1a, 410-2a, 410-3a, and 410-4a taken in the Y axis direction may be the same.

Figure 14:
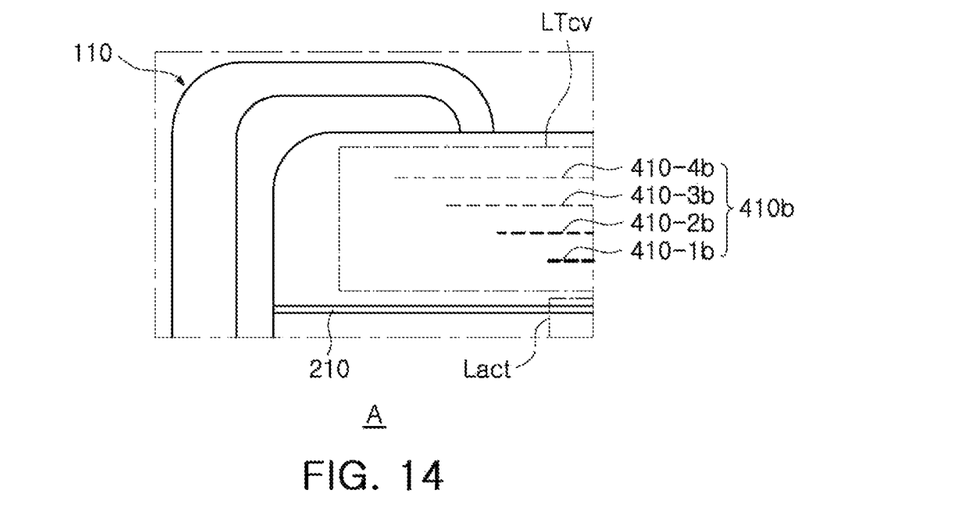
FIG. 14 is an enlarged diagram illustrating another example of partial region A illustrated in FIG. 10.

FIG. 14 is an enlarged diagram illustrating another example of partial region A illustrated in FIG. 10.

Referring to FIG. 14, thicknesses of a plurality of upper dummy pattern layers 410-1b, 410-2b, 410-3b, and 410-4b of an upper dummy layer 410 may decrease from an internal region of the ceramic body 10 to an external region in a stacking direction (e.g., Z axis direction) of the plurality of upper dummy pattern layers 410-1b, 410-2b, 410-3b, and 410-4b.

Lengths of the plurality of upper dummy pattern layers 410-1b, 410-2b, 410-3b, and 410-4b taken in the Y axis direction may gradually increase from an internal region of the ceramic body 10 to an external region in a stacking direction (e.g., Z axis direction) of the plurality of upper dummy pattern layers 410-1b, 410-2b, 410-3b, and 410-4b. However, such a configuration is not limited thereto.

According to the aforementioned exemplary embodiments, as thicknesses of the plurality of upper dummy pattern layers included in the upper cover layer are configured to decrease from an internal region of the ceramic body to an external region in a stacking direction of the plurality of upper dummy pattern layers, a decrease in reduction rate of a cover layer may be controlled when a chip is manufactured in a limited chip size.

Figure 15:
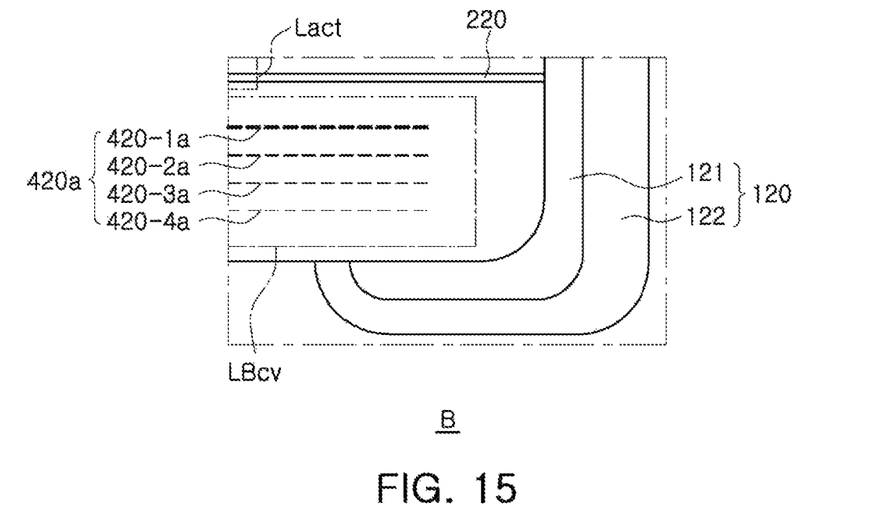
FIG. 15 is an enlarged diagram illustrating another example of partial region B illustrated in FIG. 10.

FIG. 15 is an enlarged diagram illustrating another example of partial region B illustrated in FIG. 10.

Referring to FIG. 15, thicknesses of a plurality of lower dummy pattern layers 420-1a, 420-2a, 420-3a, and 420-4a of an upper dummy layer 410 may gradually decrease from an internal region of a ceramic body 10 to an external region in a stacking direction (e.g., Z axis direction) of the plurality of lower dummy pattern layers 420-1a, 420-2a, 420-3a, and 420-4a.

Lengths of the plurality of lower dummy pattern layers 420-1a, 420-2a, 420-3a, and 420-4a taken in the Y axis direction may be the same.

Figure 16:
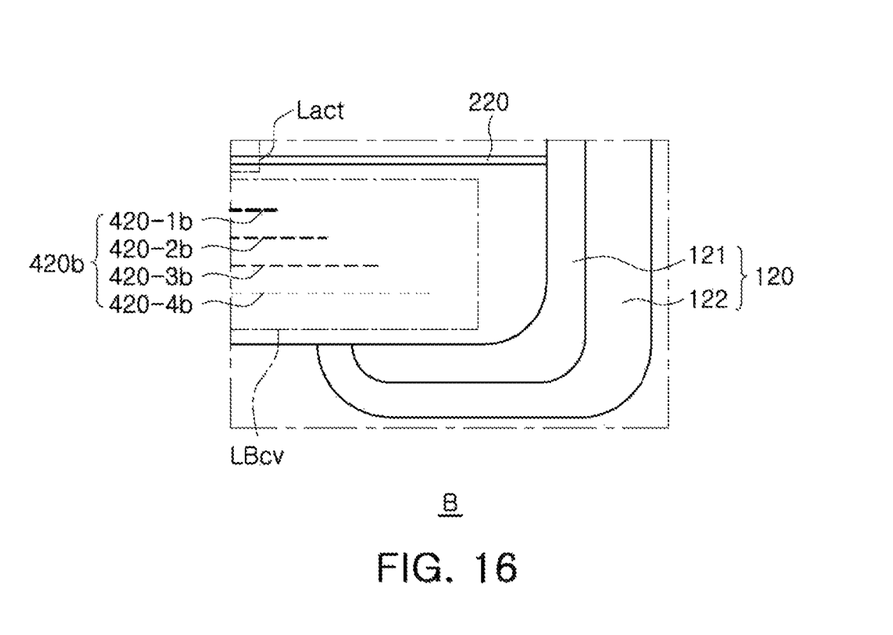
FIG. 16 is an enlarged diagram illustrating another example of partial region B illustrated in FIG. 10.

FIG. 16 is an enlarged diagram illustrating another example of partial region B illustrated in FIG. 10.

Referring to FIG. 16, thicknesses of a plurality of lower dummy pattern layers 420-1b, 420-2b, 420-3b, and 420-4b of a lower dummy layer 420 may gradually decrease from an internal region of a ceramic body 10 to an external region in a stacking direction (e.g., Z axis direction) of the plurality of lower dummy pattern layers 420-1b, 420-2b, 420-3b, and 420-4b.

Lengths of the plurality of lower dummy pattern layers 420-1b, 420-2b, 420-3b, and 420-4b taken in the Y axis direction may gradually increase from an internal region of a ceramic body 10 to an external region in a stacking direction (e.g., Z axis direction) of the plurality of lower dummy pattern layers 420-1b, 420-2b, 420-3b, and 420-4b. However, such a configuration is not limited thereto.

According to the aforementioned exemplary embodiments, as thicknesses of the plurality of lower dummy pattern layers included in the lower cover layer are configured to decrease from an internal region of the ceramic body to an external region in a stacking direction of the plurality of lower dummy pattern layers, a decrease in reduction rate of a cover layer may be controlled when a chip is manufactured in a limited chip size.

In the aforementioned exemplary embodiments, the plurality of upper and/or lower dummy pattern layers may be printed on the dielectric layer 11 using a material the same as a material of the first and second internal electrodes 210 and 220, a conductive material paste. For example, the conductive metal may be nickel (Ni), copper (Cu), palladium (Pd), or alloys thereof, but an example of the conductive metal is not limited thereto.

In the aforementioned exemplary embodiments, the first and second internal electrodes 210 and 220, and a mesh pattern of each of the upper and lower dummy layers may be formed by a conductive paste printing process. As the method of printing a conductive paste, a screen printing method, a gravure printing method, or the like, may be used, but an example of the method is not limited thereto.

According to the aforementioned exemplary embodiments, by forming a dummy conductive layer having a mesh shape on upper and lower cover layers or on at least one of the upper and lower cover layers of the ceramic body and manufacturing a composite body including the upper and lower cover layers or at least one of the upper and lower cover layers configured as the conductive layers having strong tensile strength and the ceramic body having improved strength against compression, the cohesion force between layers can be improved, and the strength and stiffness against internal and external stresses can be improved such that cracks and delamination can be prevented.

Further, the plurality of dummy pattern layers included in at least one of the upper and lower cover layers may be configured such that thicknesses thereof gradually decrease from an internal region to an external region of the ceramic body in a stacking direction of the plurality of dummy pattern layers. As a result, a contraction rate of a cover layer may be controlled to be decreased when a semiconductor circuit is manufactured in a limited chip size, and accordingly, an overall contraction rate of the semiconductor circuit may be controlled to be decreased, such that cracks can be prevented.

While the exemplary embodiments have been shown and described above, it will be apparent to those skilled in the art that modifications and variations could be made without departing from the scope of the present disclosure as defined by the appended claims.

What is claimed is:

1. A multilayer ceramic capacitor, comprising:
   a ceramic body comprising a plurality of dielectric layers stacked therein in a stacking direction;
   first and second external electrodes disposed externally on the ceramic body;
   first and second internal electrodes alternately stacked with the plurality of dielectric layers, forming an internal active layer of the ceramic body, and respectively connected to the first and second external electrodes; and
   a dummy layer, including a conductive material and having a mesh shape, disposed in at least one of an upper cover layer or a lower cover layer respectively disposed above or below the internal active layer of the ceramic body in the stacking direction,
   wherein the mesh shape of the dummy layer includes repetitive patterns that intersect with one another, and
   wherein the dummy layer is spaced apart from the first and second external electrodes.

2. The multilayer ceramic capacitor of claim 1, wherein the dummy layer comprises:
   an upper dummy layer, including a conductive material and having the mesh shape, disposed in the upper cover layer disposed above the internal active layer of the ceramic body; and
   a lower dummy layer, including a conductive material and having the mesh shape, disposed in the lower cover layer disposed below the internal active layer of the ceramic body.

3. The multilayer ceramic capacitor of claim 2,
   wherein the upper dummy layer comprises at least one upper dummy pattern layer,
   wherein the lower dummy layer comprises at least one lower dummy pattern layer, and
   wherein the at least one upper dummy pattern layer and the at least one lower dummy pattern layer each include mesh patterns having different shapes from each other.

4. The multilayer ceramic capacitor of claim 2,
   wherein the upper dummy layer comprises a plurality of upper dummy pattern layers alternately stacked with the plurality of dielectric layers, and
   wherein at least one of the plurality of upper dummy pattern layers includes a mesh pattern having a shape different from shapes of mesh patterns of remaining layers of the plurality of upper dummy pattern layers.

5. The multilayer ceramic capacitor of claim 2,
   wherein the upper dummy layer comprises a plurality of upper dummy pattern layers alternately stacked with the plurality of dielectric layers, and
   wherein the plurality of upper dummy pattern layers have mesh patterns having different shapes from one another.

6. The multilayer ceramic capacitor of claim 2,
   wherein the upper dummy layer comprises a plurality of upper dummy pattern layers alternately stacked with the plurality of dielectric layers, and
   wherein thicknesses of the plurality of upper dummy pattern layers decrease from an internal region to an external region of the ceramic body in a stacking direction of the plurality of upper dummy pattern layers.

7. The multilayer ceramic capacitor of claim 2,
   wherein the lower dummy layer comprises a plurality of lower dummy pattern layers alternately stacked with the plurality of dielectric layers, and
   wherein at least one of the plurality of lower dummy pattern layers includes a mesh pattern having a shape different from shapes of mesh patterns of remaining layers of the plurality of lower dummy pattern layers.

8. The multilayer ceramic capacitor of claim 2,
   wherein the lower dummy layer comprises a plurality of lower dummy pattern layers alternately stacked with the plurality of dielectric layers, and
   wherein the plurality of lower dummy pattern layers have mesh patterns having different shapes from one another.

9. The multilayer ceramic capacitor of claim 2,
   wherein the lower dummy layer comprises a plurality of lower dummy pattern layers alternately stacked with the plurality of dielectric layers, and
   wherein thicknesses of the plurality of upper dummy pattern layers decrease from an internal region to an external region of the ceramic body in a stacking direction of the plurality of lower dummy pattern layers.

10. The multilayer ceramic capacitor of claim 1,
wherein the mesh shape includes any one of a diamond-shaped mesh pattern, a triangular mesh pattern, a square mesh pattern, or a hexagonal mesh pattern.

11. The multilayer ceramic capacitor of claim 1,
wherein the dummy layer is not connected to the first and second internal electrodes.

12. A multilayer ceramic capacitor, comprising:
a ceramic body comprising a plurality of dielectric layers stacked therein in a stacking direction;
a first external electrode disposed on a first external surface of the ceramic body;
a second external electrode disposed on a second external surface different from the first external surface of the ceramic body;
one or more first internal electrodes alternately stacked with the plurality of dielectric layers in an internal active layer of the ceramic body, exposed to the first external surface of the ceramic body, and connected to the first external electrode;
one or more second internal electrodes alternately stacked with the plurality of dielectric layers and the one or more first internal electrodes in the internal active layer of the ceramic body, exposed to the second external surface of the ceramic body, and connected to the second external electrode;
an upper dummy layer, including a conductive material and having a mesh shape, disposed in an upper cover layer disposed above the internal active layer of the ceramic body in the stacking direction; and
a lower dummy layer, including a conductive material and having the mesh shape, disposed in a lower cover layer disposed below the internal active layer of the ceramic body in the stacking direction,
wherein the mesh shape of the upper or lower dummy layer includes repetitive patterns that intersect with one another, and
wherein at least one of the upper dummy layer or the lower dummy layer is spaced apart from the first and second external electrodes.

13. The multilayer ceramic capacitor of claim 12,
wherein the upper dummy layer comprises at least one upper dummy pattern layer,
wherein the lower dummy layer comprises at least one lower dummy pattern layer, and
wherein the at least one upper dummy pattern layer and the at least one lower dummy pattern layer comprise mesh patterns having different shapes from each other.

14. The multilayer ceramic capacitor of claim 12,
wherein the upper dummy layer comprises a plurality of upper dummy pattern layers alternately stacked with the plurality of dielectric layers, and
wherein at least one of the plurality of upper dummy pattern layers includes a mesh pattern having a shape different from shapes of mesh patterns of remaining layers of the plurality of upper dummy pattern layers.

15. The multilayer ceramic capacitor of claim 12,
wherein the upper dummy layer comprises a plurality of upper dummy pattern layers alternately stacked with the plurality of dielectric layers, and
wherein the plurality of upper dummy pattern layers have mesh patterns having different shapes from one another.

16. The multilayer ceramic capacitor of claim 12,
wherein the upper dummy layer comprises a plurality of upper dummy pattern layers alternately stacked with the plurality of dielectric layers, and
wherein thicknesses of the plurality of upper dummy pattern layers decrease from an internal region to an external region of the ceramic body in a stacking direction of the plurality of upper dummy pattern layers.

17. The multilayer ceramic capacitor of claim 12,
wherein the lower dummy layer comprises a plurality of lower dummy pattern layers alternately stacked with the plurality of dielectric layers, and
wherein at least one of the plurality of lower dummy pattern layers includes a mesh pattern having a shape different from shapes of mesh patterns of remaining layers of the plurality of lower dummy pattern layers.

18. The multilayer ceramic capacitor of claim 12,
wherein the lower dummy layer comprises a plurality of lower dummy pattern layers alternately stacked with the plurality of dielectric layers, and
wherein the plurality of lower dummy pattern layers have mesh patterns having different shapes from one another.

19. The multilayer ceramic capacitor of claim 12,
wherein the lower dummy layer comprises a plurality of lower dummy pattern layers alternately stacked with the plurality of dielectric layers, and
wherein thicknesses of the plurality of upper dummy pattern layers decrease from an internal region to an external region of the ceramic body in a stacking direction of the plurality of lower dummy pattern layers.

20. The multilayer ceramic capacitor of claim 12,
wherein the mesh shape includes any one of a diamond-shaped mesh pattern, a triangular mesh pattern, a square mesh pattern, or a hexagonal mesh pattern.

* * * * *